US010245689B2

(12) United States Patent
Alegre

(10) Patent No.: US 10,245,689 B2
(45) Date of Patent: Apr. 2, 2019

(54) ROD TENSIONING DEVICE AND ASSEMBLY PROCESS OF SUCH A DEVICE ON A ROD

(71) Applicant: Aktiebolaget SKF, Gothenburg (SE)

(72) Inventor: Marc Alegre, Maurepas (FR)

(73) Assignee: Aktiebolaget SKF, Göteborg (SE)

( * ) Notice: Subject to any disclaimer, the term of this patent is extended or adjusted under 35 U.S.C. 154(b) by 216 days.

(21) Appl. No.: 15/461,535

(22) Filed: Mar. 17, 2017

(65) Prior Publication Data
US 2017/0282312 A1 Oct. 5, 2017

(30) Foreign Application Priority Data

Mar. 29, 2016 (DE) .................. 10 2016 205 086

(51) Int. Cl.
B23P 19/06 (2006.01)
B25B 29/02 (2006.01)
(52) U.S. Cl.
CPC ............ B23P 19/067 (2013.01); B25B 29/02 (2013.01)

(58) Field of Classification Search
CPC .......................... B23P 19/067; B25B 29/02
See application file for complete search history.

(56) References Cited

U.S. PATENT DOCUMENTS

| 9,878,430 B2 * | 1/2018 | Hohmann | B23P 19/067 |
| 2014/0020515 A1 * | 1/2014 | Hohmann | B23P 19/067 81/57.38 |
| 2017/0009795 A1 * | 1/2017 | Coffiney | B25B 29/02 |

* cited by examiner

Primary Examiner — David B. Thomas
(74) Attorney, Agent, or Firm — Bryan Peckjian; SKF USA Inc. Patent Dept.

(57) ABSTRACT

The invention concerns a rod tensioning device having a first actuator, at least a second actuator and a tubular support sleeve dedicated to radially surround a threaded rod. Each of the actuators provides a cylinder, and a piston sliding in the cylinder and forming with the cylinder an annular chamber dedicated to be supplied with pressurized fluid. According to the invention, the at least second actuator is temporary axially arranged between the first actuator and the tubular support sleeve for a temporary blockwise assembly, the pistons of two axially adjacent actuators being indexed in rotation together.

10 Claims, 4 Drawing Sheets

ROD TENSIONING DEVICE AND ASSEMBLY PROCESS OF SUCH A DEVICE ON A ROD

CROSS REFERENCE TO RELATED APPLICATIONS

This application claims priority to German patent application no. 102016205086.9 filed on Mar. 29, 2016, the contents of which are fully incorporated herein by reference.

FIELD OF THE INVENTION

The present invention concerns a device for tensioning a rod before the rod is tightened in position, for example with a nut. More particularly, the invention relates to pre-stressed threaded rods used to tighten two mechanical structures together. These threaded rods may be used particularly in wind turbines or nuclear reactors in order to maintain firmly two mechanical structures together. Such a rod tensioning device is disclosed at GB 2 143 608 A.

BACKGROUND OF THE INVENTION

The tensioning of the rods can be done by applying a tightening torque to nuts resting axially on the surfaces of the structures to be tightened. The tensioning rod device exerts an axial tensile for to one end of the threaded rod by means of a tie-rod. The device rests on a surface of a structure to be tightened by means of a tubular support sleeve surrounding an end of the threaded rod. The device provides a cylinder, and a piston sliding in the cylinder and forming with the cylinder an annular chamber dedicated to be fed with pressurized fluid.

The rod is tensioned by means of the piston pressurized and is stretched. The rod is then locked by means of a nut for example, directly on the rod or on the device itself. The released rod tends to recover its resting length but is blocked by the nut. The released rod then exerts a tightening force on the mechanical parts to tighten. Such tightening method is an advantageous alternative to tightening a nut to which an important tightening torque is to be applied.

Such known rod tensioning device, for example disclosed in EP 2 361 722 B1, is designed to be used in opened spaces and are easy to install. However, such tensioning device may not be suitable for use in a reduced space for mechanical structures requiring an important tensioning axial force.

More precisely, the tensioning axial force exerted by such tensioning device depends on the pressure surface of the chamber between the piston and the cylinder. A rod tensioning device as known and of reduced dimensions, for example for being installed in a reduced space, implied a reduced potential tensioning axial force.

Moreover, the rod tensioning device as known cannot be installed in places of reduced axial dimensions, in particular between a first structure from which axially protrude a rod and a second structure that is axially close to the free end of the protruding rod.

BRIEF SUMMARY OF THE INVENTION

The present invention seeks to provide an axially compact improved rod tensioning device allowing an easier installation in particular in places of reduced axial space.

To this end, the invention concerns a rod tensioning device comprising a first actuator and a tubular support sleeve dedicated to radially surround a threaded rod. The first actuator provides a cylinder, and a piston sliding in the cylinder and forming with the cylinder an annular chamber dedicated to be supplied with pressurized fluid, the annular chamber being sealed by sealing means interposed between the cylinder and piston. The piston provides an annular threaded bore dedicated to be engaged with the threaded rod so as to be adapted to transmit a tensioning axial force from the actuator towards the threaded rod.

According to the invention, the rod tensioning device further provides at least a second actuator comprising a cylinder, and a piston sliding in the cylinder and forming with the cylinder an annular chamber dedicated to be fed with pressurized fluid, the annular chamber being sealed by sealing means interposed between the cylinder and piston. The at least second actuator is temporary axially arranged between the first actuator and the tubular support sleeve for a temporary blockwise assembly. The pistons of two axially adjacent actuators are indexed in rotation together by indexing means.

Thanks to the invention, the threaded rod is directly engaged in the piston of the first actuator. Such a device does not require an additional tie-rod and has a reduced axial dimension.

The rod tensioning device according to the invention provides a plurality of adjacent axially mounted elements forming a blockwise assembly: the tubular support sleeve, the at least second actuator and the first actuator. These elements are successively axially mounted around the threaded rod. The axial dimension of each of these separate elements is highly reduced compared to an assembled standard tensioning device, and then each of these elements can be put in a reduced axial place before being install around the rod, for example between the free end of the threaded rod and an upper structure. Thanks to the invention, the rod tensioning device is adapted for being installed in places of reduced axial space.

Furthermore, these separate elements do not need to be fastened each other. The hydraulic pressure exerted by the pressurized fluid within the annular chambers of the actuators is enough to ensure the axial tightening of these elements together and onto the support structure.

Another advantage is that at least a second annular chamber on which the pressurized fluid acts is defined with the at least second actuator. Such a tensioning device integrating at least two annular chambers can be provided with the same pressure surface as a standard tensioning device with one unique annular chamber. A tensioning device can then be dimensioned with a reduced radial dimension but adapted to exert a similar tensioning force.

Another advantage is that the elements of the tensioning devices are temporary assembled and can be dismounted and mounted as many times as needed. The sealing means between the piston and the cylinder of each actuator is easily accessible after each dismounting and can be then easily checked and replaced after each device use.

According to further aspects of the invention which are advantageous but not compulsory, such a rod tensioning device may incorporate one or several of the following features:

The tensioning device provides the first and second actuator and the tubular support sleeve, and at least one additional actuator axially arranged between the first and second actuator.

The tubular support sleeve provides at least one passage means on its outer periphery adapted to receive a tool dedicated to cooperate with a nut mounted engaged around the threaded rod.

The tubular support sleeve is in one integral piece.

The tubular support sleeve provides at least two parts.

Each of the parts of the tubular support sleeve provides indexing mounting means with the axially adjacent part.

The indexing means between two axially adjacent parts of the tubular support sleeve provide a protruding portion and a recess engaged with each other.

The cylinder of each of the actuators provides an axial portion and a radially inwardly protruding flange that extends from the axial portion.

The piston of each of the actuators provides an axial portion and a radially outwardly protruding flange that extends from the axial portion.

The annular chamber of each of the actuators is at least defined between a first sealing means, a second sealing means, the axial flange of the piston and the axial flange of the cylinder.

A first sealing means is radially provided between a radially internal surface of the flange of the cylinder and the axial portion of the piston.

A second sealing means is radially provided between a radially external surface of the flange of the piston and the axial portion of the cylinder.

The cylinder of the actuator directly mounted on the tubular support sleeve provides indexing mounting means with the tubular support sleeve.

The indexing means between the cylinder and the tubular support sleeve provide a protruding portion and a recess engaged with each other.

The cylinders of two axially adjacent actuators are in direct support contact, provide indexing means with each other and are temporary fastened together by temporary fixing means.

The indexing means between two axially adjacent cylinders provide pins inserted in corresponding openings provided on the cylinders.

The temporary fixing means are screw.

The indexing means between two axially adjacent pistons provide pins inserted in corresponding openings provided on the pistons.

The pins are made from an elastic material.

The piston or the cylinder provides an opening for receiving pressurized fluid, and a channel adapted to supply the pressurized fluid to the annular chamber defined between the piston and the cylinder.

Only the piston or the cylinder of the first actuator provides an opening for receiving pressurized fluid, and the cylinders of all the actuators of the tensioning device provide each a channel connected together and adapted to supply the pressurized fluid to the annular chambers.

The connection between the channels of two axially adjacent cylinders is sealed by sealing means.

The invention also relates to an assembly of a rod tensioning device according to any of the preceding embodiments on a threaded rod axially protruding from a structure, comprising the following steps:

The tubular support sleeve is first mounted around the threaded rod, the tubular support resting against the structure;

The at least second actuator is axially mounted on the tubular support sleeve and around the threaded rod, the at least second actuator resting against the tubular support sleeve;

The first actuator is axially mounted on the second actuator and around the threaded rod, the first actuator resting against the second actuator, the relative position of the pistons of the first actuator and the second actuator being indexed by indexing means; and The piston of the first actuator is arranged to cooperate with the threaded rod.

BRIEF DESCRIPTION OF THE SEVERAL VIEWS OF THE DRAWING

The invention will now be explained in correspondence with the annexed figures, as an illustrative example, without restricting the object of the invention. In the annexed figures.

DETAILED DESCRIPTION OF THE INVENTION

Figure 1:
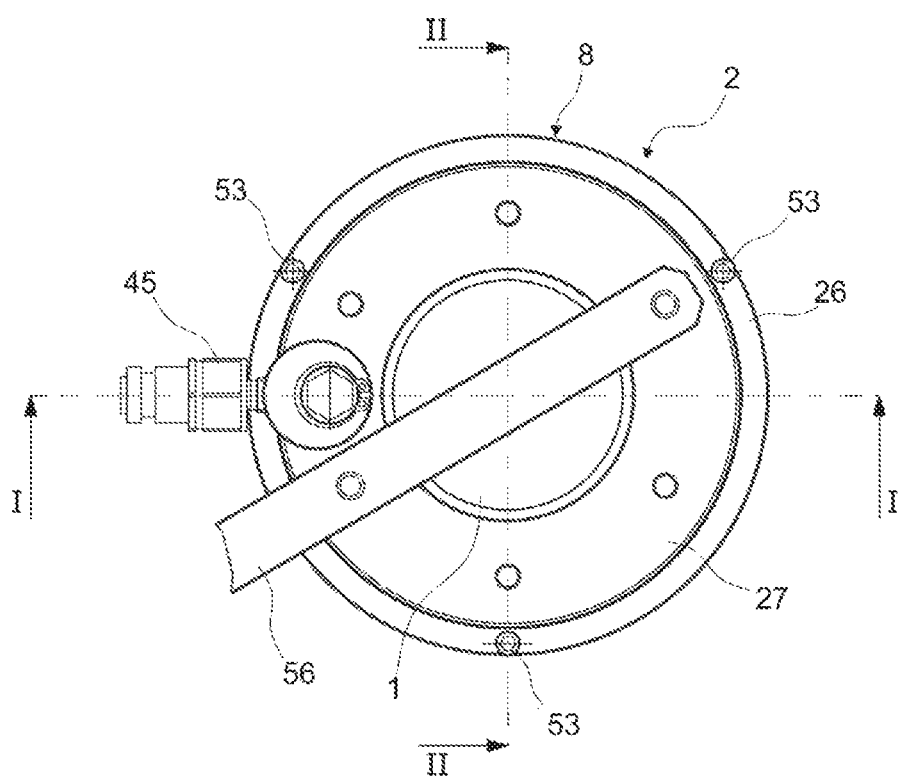
FIG. 1 is an upper view of a rod tensioning device according to a first embodiment of the invention.
Figure 2:
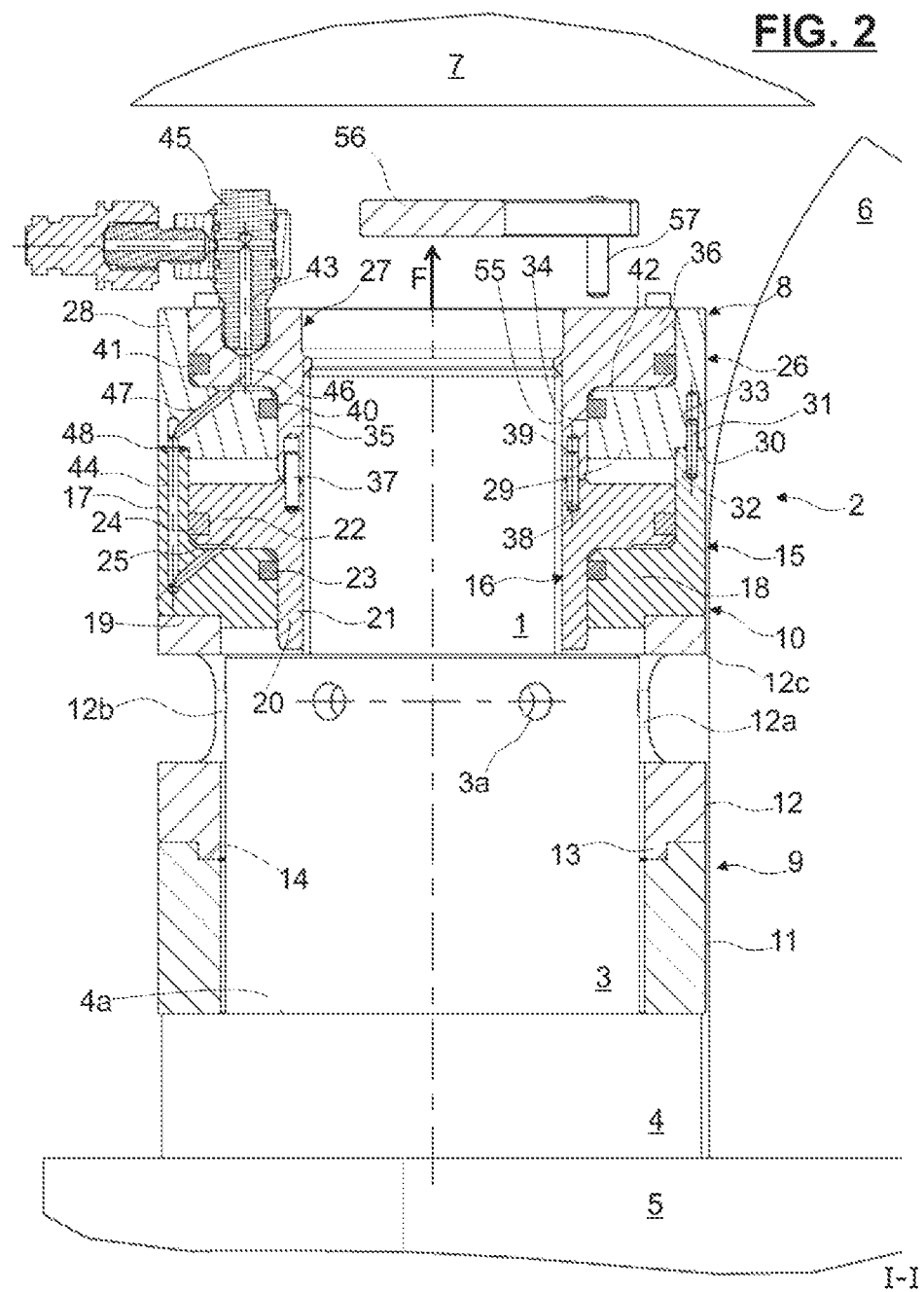
FIG. 2 is a sectional view I-I of the rod tensioning device of FIG. 1.
Figure 3:
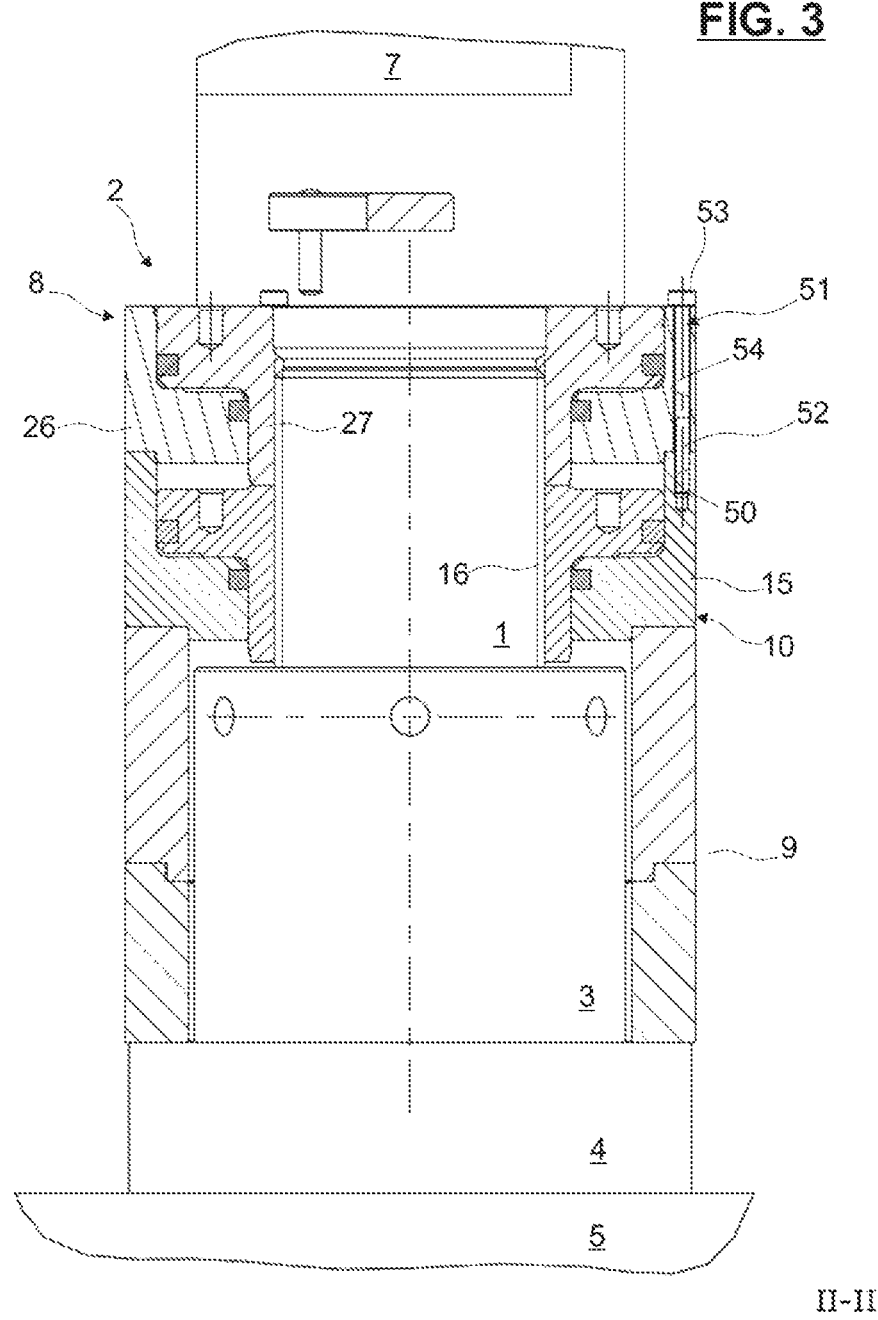
FIG. 3 is a sectional view II-II of the rod tensioning device of FIG. 1.

Referring first to FIGS. 1 to 3, which illustrate an example of an embodiment of a rod tensioning device according to the invention, a threaded rod 1 axially protrudes from a structure 4 and is to be axially pre-stressed using a tensioning device referred generally as 2 and thereafter maintained in the pre-stressed state by a nut 3 resting against a surface 4a of a first structure 4 to be tightened with a second structure 5. For illustrating the dimensional constraints faced by the tensioning device, the outer structure 6 limits the radial dimension for the tensioning device 2 around the threaded rod 1 and the upper structure 7 limits the axial dimension for installing and using the tensioning device 2.

The nut 3 provides a plurality of openings 3a on its outer periphery dedicated to receive an external tool. As an alternative not illustrated, the nut 3 may be hexagonal and provided with a fitting-up wrench mounted around the nut 3. The fitting-up wrench provides internal surfaces in contact with the corresponding hexagonal and is adapted to cooperate with an external tool.

The tensioning device 2 provides a first actuator 8 adapted to provide an axial force F to the threaded rod 1, and a tubular support sleeve 9. According to the invention, the tensioning device 2 further provides a second actuator 10 axially arranged between the first actuator 8 and the tubular support sleeve 9.

The tubular support sleeve 9 of a generally annular shape surrounds the free end of the threaded rod 1 protruding from the surface 4a of the structure 4 to be tightened.

The tubular support sleeve 9 provides a lower part 11 and an upper part 12. The lower part rests on the surface 4a of the first structure 4 to be tightened. The upper part 12 rests on the lower part 11.

The upper part 12 provides an annular rib 13 extending axially towards the other part 11. The rib 13 is engaged in a corresponding annular recess 14 of the lower part 11 so as to radially maintain the two parts 11, 12 of the tubular support sleeve by centering the upper part 12 inside the lower part 11. The rib 13 and the recess 14 form indexing mounting means for the parts 11, 12.

Two passages 12a, 12b are provided in the upper part 12 of the tubular support sleeve 9 for a non-illustrating external tool capable of acting on the nut 3 for rotating the latter towards the surface 4a. The non-illustrating tool is inserted through one of the passages 12a, 12b in order to cooperate with the openings 3a and to rotate the nut 3. The nut 3 can thus be fitted-up against the surface 4a.

The second actuator 10 provides a cylinder 15 and a piston 16 sliding inside the cylinder 15. The cylinder 15, of a generally annular shape, has an axial portion 17 and a radial flange 18. The radial flange extends internally towards the piston 16. The cylinder 15 provides a recess 19 contacting the upper end 12c of upper part 12 of the tubular support sleeve 9. The cylinder 15 is radially maintained on the tubular support sleeve 9 by centering the sleeve 9 inside the cylinder 15.

The cylinder 15 further provides a bore 20 wherein is arranged the piston 16, of a generally annular shape. The piston 16 provides an axial portion 21 and a radial flange 22. The radial flange 22 extends radially towards the cylinder 15. The axial portion 21 of the piston 16 axially slides against the radially internal surface of the flange 18 of the cylinder 15 and the flange 22 of the piston 16 axially slides against the radially internal surface of the axial portion 17 of the cylinder 15.

A first sealing means 23 of the second actuator 10 is arranged in an annular groove provided on the radially internal surface of the flange 18 of the cylinder 15, the first sealing means 23 being adapted to seal the contact between the cylinder 15 and the piston 16.

A second sealing means 24 of the second actuator 10 is arranged in an annular groove provided on the radially external surface of the flange 22 of the piston 16, the second sealing means 24 being adapted to seal the contact between the cylinder 15 and the piston 16.

The first and second sealing means 23, 24 can be annular sealing rings in sliding contact with the mechanical part facing it. The rings can be in plastic or synthetic material.

An annular chamber 25 of the second actuator 10 is located between the first and second sealing means 23, 24, the flange 18 of the cylinder 15 and the flange 22 of the piston 16. The cylinder 15 further provides a channel 44 adapted to supply a pressurized fluid into the annular chamber 25 in order to urge the piston 16 within the cylinder 15.

The first actuator 8 is axially mounted on the second actuator 10. The first actuator 8 provides a cylinder 26 and a piston 27 sliding inside the cylinder 26. The cylinder 26, of a generally annular shape, has an axial portion 28 and a radial flange 29. The radial flange extends internally towards the piston 27. The cylinder 26 provides a recess 30 contacting the upper end of the axial portion 17 of the cylinder 15. The cylinder 26 of the first actuator 8 is radially maintained on the cylinder 15 of the second actuator 10 by centering the cylinder 15 inside the cylinder 26.

The cylinders 15 and 26 further provide indexing means, for example at least one pin 31 in the FIG. 2. The pin 31 is located within a first opening 32 provided on the cylinder 15 and within a second opening 33 provided on the cylinder 26, the openings 32, 33 axially facing each other when the cylinders 15, 26 are set in their required relative position. Furthermore, the pins prevent any relative rotation between the cylinders 15, 26 of the first and second actuators 8, 10, respectively. The indexing means between the cylinders 15 and 26 may provide a plurality of pins 31.

Furthermore, the cylinders 15 and 26 are temporary fastened together by temporary fixing means. The temporary fixing means are dedicated to be mounted and dismounted. As an example illustrated in FIG. 3, the cylinder 15 of the second actuator 10 provides a threaded opening 50 receiving the threaded body 52 of a screw 51, the screw passing through an opening 54 provided on the cylinder 26. The screw 51 further provides a head 53 so as to tighten the cylinder 26 to the cylinder 15. The temporary fixing means between the cylinders 15 and 26 may provide a plurality of screws 51.

The cylinder 26 further provides a bore 34 wherein is arranged the piston 27, of a generally annular shape. The piston 27 provides an axial portion 35 and a radial flange 36. The radial flange 36 extends radially towards the cylinder 26. The axial portion 35 of the piston 27 axially slides against the radially internal surface of the flange 29 of the cylinder 26 and the flange 36 of the piston 27 axially slides against the radially internal surface of the axial portion 28 of the cylinder 26.

The pistons 16 and 27 further provide indexing means, for example pins 37 in the FIG. 2. Each pin 37 is located within a first opening 38 provided on the piston 16 and within a second opening 39 provided on the piston 27, the openings 38, 39 axially facing each other when the pistons 16, 27 are set in their required relative position. Furthermore, the pins prevent any relative rotation between the pistons 16, 27 of the first and second actuators 8, 10, respectively.

A first sealing means 40 of the first actuator 8 is arranged in an annular groove provided on the radially internal surface of the flange 29 of the cylinder 26, the first sealing means 40 being adapted to seal the contact between the cylinder 26 and the piston 27.

A second sealing means 41 of the first actuator 8 is arranged in an annular groove provided on the radially external surface of the flange 36 of the piston 27, the second sealing means 41 being adapted to seal the contact between the cylinder 26 and the piston 27.

An annular chamber 42 of the first actuator 8 is located between the first and second sealing means 40, 41, the flange 29 of the cylinder 26 and the flange 36 of the piston 27. The piston 27 further provides an opening 43 connected to a pressurized fluid injector 45, the opening 43 being connected to a channel 46 adapted to supply the pressurized fluid into the annular chamber 42 in order to urge the piston 27 within the cylinder 26.

The cylinder 26 further provides a channel 47 from the annular chamber 42 and connected to the channel 44 of the cylinder 15 of the second actuator 10. The pressurized fluid supplied to the annular chamber 42 of the first actuator 8 is also supplied to the annular chamber 25 of the second actuator 10. The connection between the channels 44 and 47 is sealed by sealing means 48, for example an annular ring.

As an alternative not illustrated, the cylinder of the first actuator may provide an opening to receive the pressurized fluid injector. As another embodiment, each of the actuators may be connected to an independent pressurized fluid injector.

The piston 27 of the first actuator 8 provides a threaded bore 55 adapted to be engaged with the threaded rod 1.

The rod tensioning device 2 according to the invention provides a plurality of adjacent axially mounted elements: the tubular support sleeve 9 in two parts 11, 12, a piston 16 in a cylinder 15 so as to form the second actuator 10, and another piston 27 in a cylinder 26 so as to form the first actuator 8. Each of these elements are dimensioned so as to be axially put between the upper end of the threaded rod 1 protruding from the structure 4 and the upper structure 7. According to the invention, the lower part 11 of the tubular support sleeve 9 is first installed on the surface 4a of the structure 4 and around the rod 1. Then and successively, the upper part 12 of the tubular sleeve 9 is axially mounted on the lower part 9, the second actuator 10 is axially mounted on the upper part 12 of the tubular sleeve 9, and the first actuator 8 is axially mounted on the second actuator 10, the threaded rod 1 being connected to the first actuator 8. The corresponding pistons 16, 27 and the corresponding cylinders 15, 26 are indexed in rotation one to the other by pins 37, 31 respectively.

When a pressurized fluid is supplied to the annular chambers 42, 25 of the first and second actuators 8, 10, respectively, the pistons 27, 16 axially slide within the cylinders 26, 15. The threaded rod 1 being firmly engaged with the piston 27 of the first actuator 8, the rod 1 is axially stretched.

An external tool is engaged through an opening 12a, 12b of the tubular support sleeve 9 so as to rotate down the nut 3 up to the surface 4a of the structure 4. The rod 1 is then locked by means of the nut 3. The released rod 1 tends to recover its resting length but is blocked by the nut 3. The released rod 1 then exerts a tightening force on the mechanical parts 4, 5 to tighten.

As illustrated in the embodiment of FIGS. 1 to 3, the device 2 may also cooperate with a wrench 56 comprising pins 57 dedicated to be inserted within openings provided on the piston 27 of the first actuator 8. The wrench 56 can be used by an operator at the end of the rod tightening process to rotate down the piston 27 around the threaded rod 1, hence to also rotate down the piston 16, in order to remove the pressurized fluid from the annular chambers 42, 25.

After use, the rod tensioning device 2 can be dismounted and mounted for another rod tightening operation.

Figure 4:
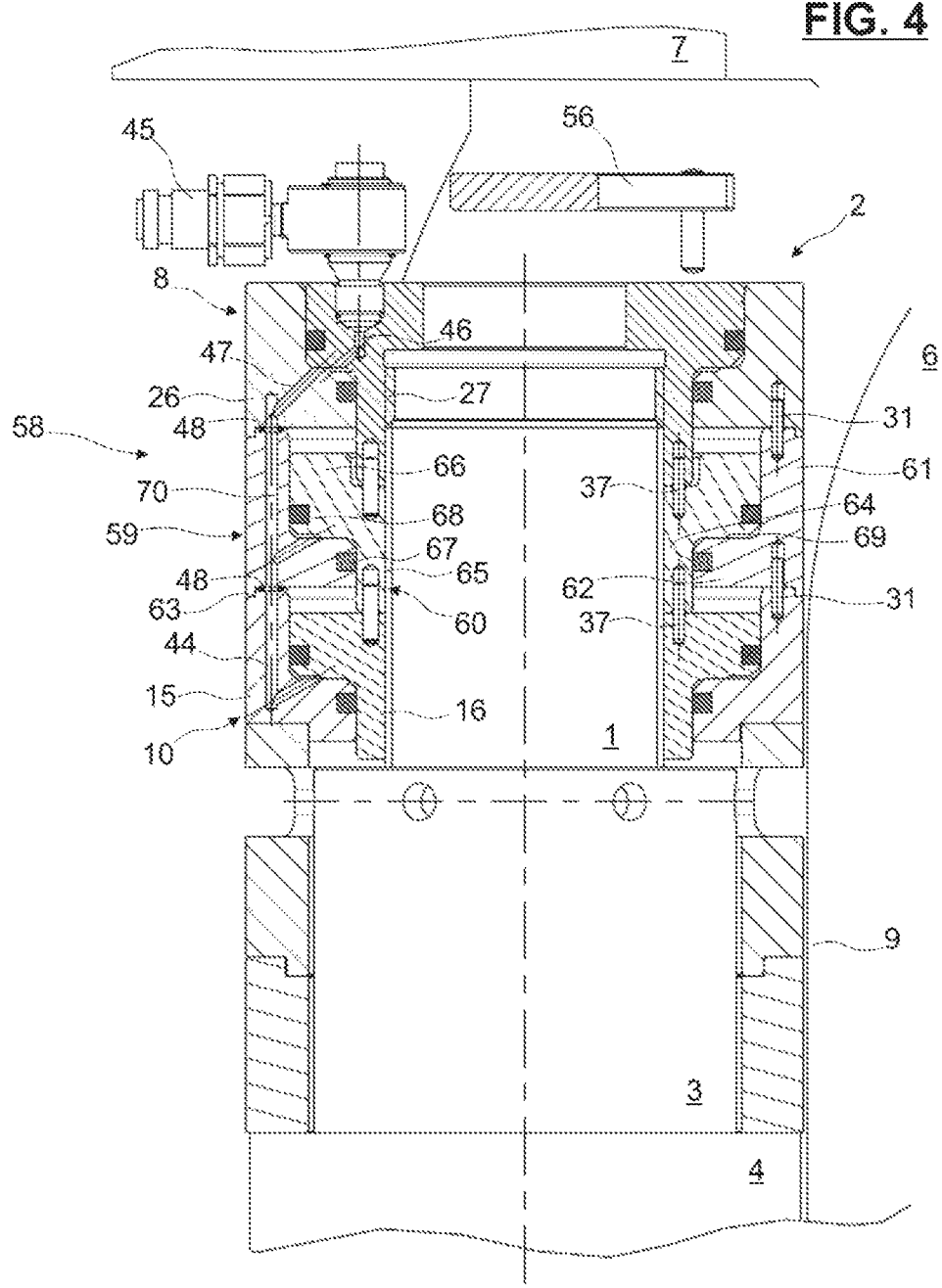
FIG. 4 is a sectional view of a rod tensioning device according to a second embodiment of the invention.

The second embodiment of the invention illustrated in FIG. 4, in which identical elements bear the same references, differs from the first embodiment of FIGS. 1 to 3 in that a third actuator 58 is axially arranged between the first actuator 8 and the second actuator 10.

The third actuator 58 is axially mounted on the second actuator 10. The first actuator 58 provides a cylinder 59 and a piston 60 sliding inside the cylinder 59. The cylinder 59, of a generally annular shape, has an axial portion 61 and a radial flange 62. The radial flange extends internally towards the piston 60. The cylinder 59 provides a rib 63 contacting the upper end of the cylinder 15. The cylinder 59 of the third actuator 58 is radially maintained on the cylinder 15 of the second actuator 10 by centering the cylinder 59 inside the cylinder 15. In a similar way, the cylinder 26 of the first actuator 8 is radially maintained on the cylinder 59 of the third actuator 58 by centering the cylinder 26 inside the cylinder 59.

The cylinders 15, 59 and 26, 59 further provide indexing means, for example pins 31.

Furthermore, the cylinders 15, 59 and 26, 59 are fastened together by fixing means not illustrated. The fixing means may consist in the screw of the first embodiment.

The cylinder 59 further provides a bore 64 wherein is arranged the piston 60, of a generally annular shape. The piston 60 provides an axial portion 65 and a radial flange 66. The radial flange 66 extends radially towards the cylinder 59. The axial portion 65 of the piston 60 axially slides against the radially internal surface of the flange 62 of the cylinder 59 and the flange 66 of the piston 60 axially slides against the radially internal surface of the axial portion 61 of the cylinder 59.

The pistons 16, 60 and 27, 60 further provide indexing means, for example pins 37.

A first sealing means 67 of the third actuator 58 is arranged in an annular groove provided on the radially internal surface of the flange 62 of the cylinder 59, the first sealing means 67 being adapted to seal the contact between the cylinder 59 and the piston 60.

A second sealing means 68 of the third actuator 58 is arranged in an annular groove provided on the radially external surface of the flange 66 of the piston 60, the second sealing means 68 being adapted to seal the contact between the cylinder 59 and the piston 60.

An annular chamber 69 of the third actuator 58 is located between the first and second sealing means 67, 68, the flange 62 of the cylinder 59 and the flange 66 of the piston 60.

The cylinder 59 further provides a channel 70 from the annular chamber 69 and connected to the channel 44 of the cylinder 15 on one side and to the channel 47 of the cylinder 26. The pressurized fluid supplied to the first actuator 8 is also supplied to the annular chamber 69 of the third actuator 58 and to the annular chamber 25 of the second actuator 10. The connections between the channels 44, 70 and 47, 70 are sealed by sealing means 48, for example an annular ring.

The rod tensioning device 2 may incorporate none or several additional actuators 58 between the first actuator 8 and the second actuator 10, as many as needed to exert the required tensioning force on the threaded rod 1.

The invention claimed is:

1. A rod tensioning device comprising:
a first actuator, and a tubular support sleeve dedicated to radially surround a threaded rod, the first actuator providing a cylinder, and a piston sliding in the cylinder and forming with the cylinder an annular chamber dedicated to be supplied with pressurized fluid, the annular chamber being sealed by sealing means interposed between the cylinder and piston, the piston having an annular threaded bore dedicated to be engaged with the threaded rod so as to be adapted to transmit a tensioning axial force (F) from the actuator towards the threaded rod, and
at least a second actuator having a cylinder, and a piston sliding in the cylinder and forming with the cylinder an annular chamber dedicated to be supplied with pressurized fluid, the annular chamber being sealed by sealing means interposed between the cylinder and piston, the at least second actuator being temporary axially arranged between the first actuator and the tubular support sleeve for a temporary blockwise assembly, the pistons of two axially adjacent actuators being indexed in rotation together by indexing means.

2. The rod tensioning device according to claim 1, further comprising at least one additional actuator axially arranged between the first actuator and second actuator.

3. The rod tensioning device according to claim 1, wherein the tubular support sleeve includes at least two parts.

4. The rod tensioning device according to claim 1, wherein the cylinder of the second actuator directly mounted on the tubular support sleeve includes indexing mounting means with the tubular support sleeve.

5. The rod tensioning device according to claim 1, wherein the cylinders of two axially adjacent actuators are in direct contact and include indexing means with each other and are temporary fastened together by temporary fixing means.

6. The rod tensioning device according to claim 1, wherein the indexing means between two axially adjacent cylinders and/or pistons include pins inserted in corresponding openings provided on the cylinders and/or pistons, respectively.

7. The rod tensioning device according to claim 1, wherein the piston or the cylinder of the first actuator provides an opening for receiving pressurized fluid, and a channel adapted to supply the pressurized fluid to the annular chamber defined between the piston and the cylinder.

8. The rod tensioning device according to the claim 1, wherein only the piston or the cylinder of the first actuator provides an opening for receiving pressurized fluid, and the cylinders of all the actuators of the tensioning device each include a channel connected together and adapted to supply the pressurized fluid to the annular chambers.

9. The rod tensioning device according to the claim 7, wherein the connection between the channels of two axially adjacent cylinders is sealed by sealing means.

10. A method of assembling a rod tensioning device that is disposed around a threaded rod axially protruding from a structure, the method comprising:

providing a first actuator, and a tubular support sleeve dedicated to radially surround a threaded rod, the first actuator providing a cylinder, and a piston sliding in the cylinder and forming with the cylinder an annular chamber dedicated to be supplied with pressurized fluid, the annular chamber being sealed by sealing means interposed between the cylinder and piston, the piston having an annular threaded bore dedicated to be engaged with the threaded rod so as to be adapted to transmit a tensioning axial force (F) from the actuator towards the threaded rod, and providing at least a second actuator having a cylinder, and a piston sliding in the cylinder and forming with the cylinder an annular chamber dedicated to be supplied with pressurized fluid, the annular chamber being sealed by sealing means interposed between the cylinder and piston, the at least second actuator being temporary axially arranged between the first actuator and the tubular support sleeve for a temporary blockwise assembly, the pistons of two axially adjacent actuators being indexed in rotation together by indexing means, further comprising the steps:

mounting the tubular support sleeve around the threaded rod, the tubular support resting against the structure;

axially mounting the at least second actuator on the tubular support sleeve and around the threaded rod, the at least second actuator resting against the tubular support sleeve;

axially mounting the first actuator on the second actuator and around the threaded rod, the first actuator resting against the second actuator, the relative position of the piston of the first actuator and the piston of the second actuator being indexed by indexing means; and arranging the piston of the first actuator to cooperate with the threaded rod.

\* \* \* \* \*